United States Patent
Malan et al.

(10) Patent No.: US 11,258,307 B2
(45) Date of Patent: Feb. 22, 2022

(54) WIRELESS POWER SYSTEM WITH FOREIGN OBJECT DETECTION

(71) Applicant: Apple Inc., Cupertino, CA (US)

(72) Inventors: Wynand L. Malan, Auckland (NZ); Zachary S. Harris, Auckland (NZ)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 16/739,683

(22) Filed: Jan. 10, 2020

(65) Prior Publication Data
US 2021/0050746 A1 Feb. 18, 2021

Related U.S. Application Data

(60) Provisional application No. 62/886,614, filed on Aug. 14, 2019.

(51) Int. Cl.
| | | |
|---|---|---|
| H02J 50/60 | (2016.01) | |
| H02J 7/00 | (2006.01) | |
| G08B 7/06 | (2006.01) | |
| H02J 50/80 | (2016.01) | |
| H02J 50/10 | (2016.01) | |

(52) U.S. Cl.
CPC .............. H02J 50/60 (2016.02); G08B 7/06 (2013.01); H02J 7/0048 (2020.01); H02J 50/10 (2016.02); H02J 50/80 (2016.02)

(58) Field of Classification Search
CPC .................................................... H02J 50/60
USPC ........................................................ 320/108
See application file for complete search history.

(56) References Cited

U.S. PATENT DOCUMENTS

| | | |
|---|---|---|
| 9,423,439 B2 | 8/2016 | Jung et al. |
| 10,110,066 B2 | 10/2018 | Watanabe et al. |
| 10,320,234 B2 | 6/2019 | Aioanei |
| 10,391,875 B2 | 8/2019 | Huang et al. |
| 2014/0232199 A1 | 8/2014 | Jung et al. |

(Continued)

FOREIGN PATENT DOCUMENTS

| | | | |
|---|---|---|---|
| EP | 3432445 | * 2/2016 | .............. H02J 50/80 |
| EP | 3432445 A1 | 1/2019 | |
| EP | 2713473 A2 | 11/2019 | |

*Primary Examiner* — Edward Tso
*Assistant Examiner* — Ahmed H Omar
(74) *Attorney, Agent, or Firm* — Treyz Law Group, P.C.; Jason Tsai

(57) ABSTRACT

A wireless power system has a wireless power transmitting device and a wireless power receiving device. The wireless power transmitting device may be a wireless charging mat or other device with a charging surface. The wireless power receiving device may be a portable electronic device receiving transmitted wireless power signals from the wireless power transmitting device while resting on the charging surface. During digital ping operations, low-power wireless power signals may be transmitted from the wireless power transmitting device. Information gathered during the digital ping such as wireless power transmission efficiency information, coupling coefficient information, Q-factor information, and coil inductance information may be used in determining whether a foreign object is present. Control circuitry in the transmitting device can cause the receiving device to present an alert for a user indicating that wireless power transfer operations are commencing in response to determining that no foreign object is present.

23 Claims, 2 Drawing Sheets

(56) References Cited

U.S. PATENT DOCUMENTS

| | | |
|---|---|---|
| 2017/0279495 A1 | 9/2017 | Kim et al. |
| 2017/0331334 A1* | 11/2017 | Park .................... H04B 5/0037 |
| 2018/0152050 A1 | 5/2018 | Ko et al. |
| 2018/0219416 A1 | 8/2018 | Van Wageningen et al. |
| 2019/0013703 A1* | 1/2019 | Shichino ................ H02J 50/60 |
| 2019/0067992 A1 | 2/2019 | Liu et al. |
| 2019/0148987 A1 | 5/2019 | Jung |
| 2019/0190320 A1* | 6/2019 | Park .......................... H02J 7/02 |
| 2019/0222066 A1* | 7/2019 | Kozakai ................. H02J 50/12 |

* cited by examiner

WIRELESS POWER SYSTEM WITH FOREIGN OBJECT DETECTION

This application claims the benefit of provisional patent application No. 62/886,614, filed Aug. 14, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power.

SUMMARY

A wireless power system has a wireless power transmitting device and a wireless power receiving device. The wireless power transmitting device may be a wireless charging mat or other device with a charging surface. The wireless power receiving device may be a portable electronic device receiving transmitted wireless power signals from the wireless power transmitting device while resting on the charging surface.

After the wireless power receiving device has been placed on the charging surface and before normal wireless power transmission has commenced, the wireless power transmitting device may perform digital ping operations. During digital ping operations, low-level wireless power signals may be transmitted from the wireless power transmitting device. Sufficient power is supplied to power communications circuitry in the wireless power receiving device, but not to fully power the wireless power receiving device (e.g., to charge a battery in the wireless power receiving device).

Information gathered during the digital ping such as wireless power transmission efficiency information, coupling coefficient information, Q-factor information, and coil inductance information may be used in determining whether a foreign object is present on the charging surface in the vicinity of the wireless power transmitting and receiving devices. Control circuitry in the wireless power transmitting device can cause the wireless power receiving device to present an alert for a user indicating that wireless power transfer operations are commencing in response to determining that no foreign object is present. The alert may be presented during or immediately after the digital ping, before completion of negotiations between the wireless power transmitting device and wireless power receiving device to establish appropriate wireless power transmission levels to use during normal operation to charge a battery in the wireless power receiving device.

DETAILED DESCRIPTION

A wireless power system includes a wireless power transmitting device such as a wireless charging mat. The wireless power transmitting device wirelessly transmits power to one or more wireless power receiving devices. The wireless power receiving devices may include devices such as a wrist watches, cellular telephones, tablet computers, laptop computers, or other electronic equipment. Each wireless power receiving device uses power from the wireless power transmitting device for powering the device and for charging an internal battery.

Wireless power is transmitted from the wireless power transmitting device to a wireless power receiving device using one or more wireless power transmitting coils. The wireless power receiving device has one or more wireless power receiving coils coupled to rectifier circuitry. The rectifier circuitry converts received wireless power signals from the wireless power receiving coils into direct-current power.

Figure 1:
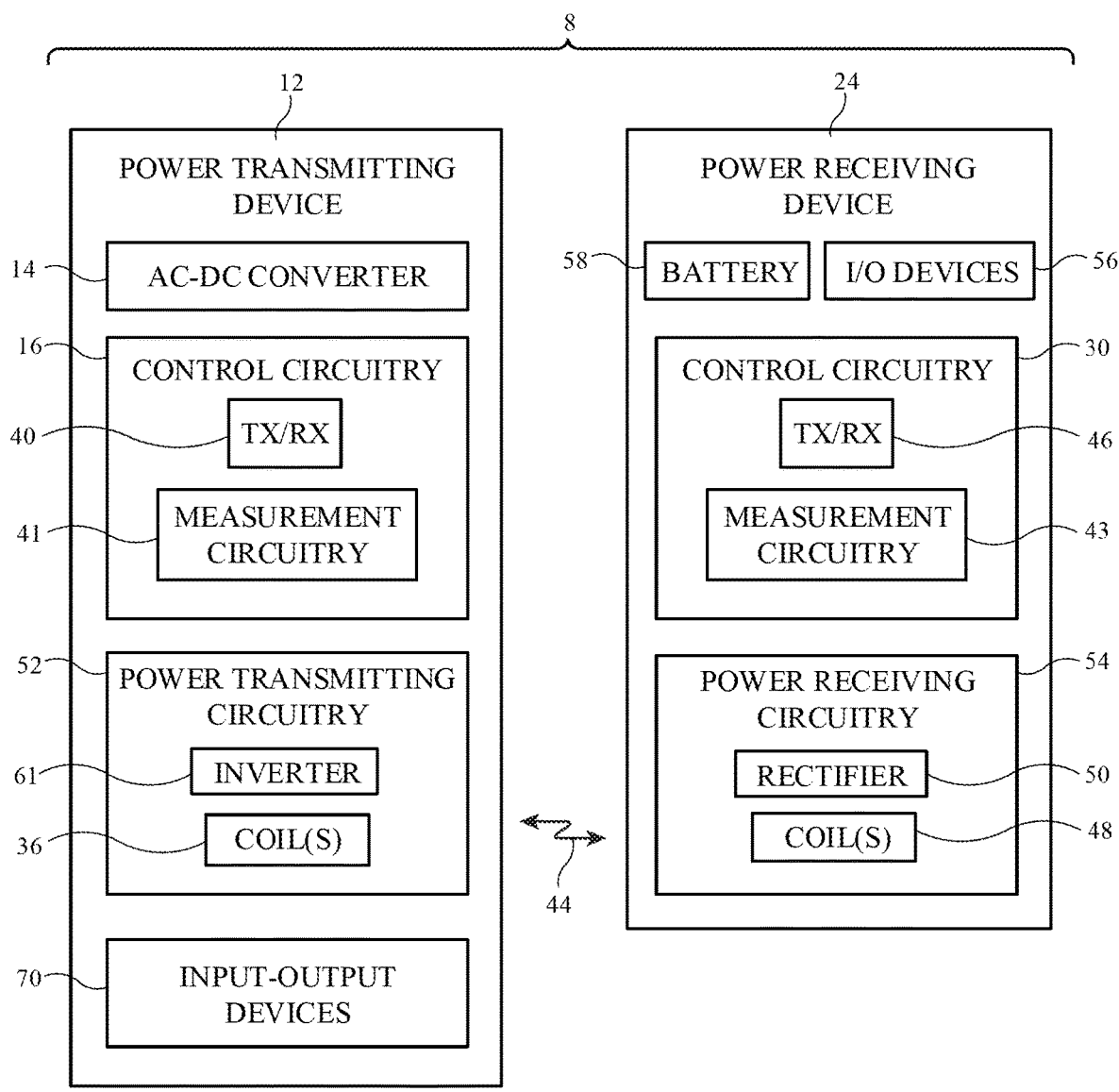
FIG. 1 is a schematic diagram of an illustrative wireless power system in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wrist watch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable device, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24 such as input-output devices 56. Input-output devices 56 may include input devices for gathering user input and/or making environmental measurements and may include output devices for providing a user with output. As an example, input-output devices 56 may include a display for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 56 may also include sensors for gathering input from a user and/or for making measurements of the surroundings of system 8. Illustrative sensors that may be included in input-output devices 56 include three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors and/or ultraviolet light cameras), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, optical sensors for making spectral measurements and other measurements on target objects (e.g., by emitting light and measuring reflected light), microphones for gathering voice commands and other audio input, distance sensors, sensors that are configured to gather information on motion, position, and/or orientation (e.g., accelerometers, gyroscopes, compasses, and/or inertial measurement units that include all of these sensors or a subset of one or two of these sensors), sensors such as buttons that detect button press input, joysticks with sensors that detect joystick movement, keyboards, and/or other sensors. Device 12 may have one or more input-output devices 70 (e.g., input devices and/or output devices of the type described in connection with input-output devices 56) or input-output devices 70 may be omitted (e.g., to reduce device complexity).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has measurement circuitry 41. Measurement circuitry 41 may be used to detect external objects on the charging surface of the housing of device 12 (e.g., on the top of a charging mat or, if desired, to detect objects adjacent to the coupling surface of a charging puck). The housing of device 12 may have polymer walls, walls of other dielectric, metal structures, fabric, and/or other housing wall structures that enclose coils 36 and other circuitry of device 10. The charging surface may be a planer outer surface of the upper housing wall of device 12. Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information from the frequency of ringing signals created in response to the impulses, Q-factor information from the decay envelope of the ringing signals, etc.) and signal detection circuitry (e.g., filters, analog-to-digital converters, impulse response measurement circuits, etc.). In some configurations, Q-factor measurements, inductance measurement, and other measurements may be made (e.g., before wireless power transmission operations have commenced, during wireless power transmission, during pauses between power transmission periods, and/or at other suitable times). Switching circuitry in device 12 may be used to switch desired coils into use during measurements on coils 36, during wireless power transmission, etc.

Measurement circuitry 43 in control circuitry 30 may include signal generator circuitry, pulse generator circuitry, signal detection circuitry, and other and/or measurement circuitry (e.g., circuitry of the type described in connection with circuitry 41 in control circuitry 16). Circuitry 41 and/or circuitry 43 may be used in making current and voltage measurements, measurements of transmitted and received power for power transmission efficiency estimates, coil Q-factor measurements, coil inductance measurements, coupling coefficient measurements, and/or other measurements. Based on this information or other information, control circuitry 30 can characterize the operation of devices 12 and 24. For example, measurement circuitry 41 can measure coil(s) 36 to determine the inductance(s) and Q-factor value(s) for coil(s) 36, can measure transmitted power in device 12 (e.g., by measuring the direct-current voltage powering inverter 61 and direct-current current of inverter 61 and/or by otherwise measuring voltages and currents in the wireless power transmitting circuitry of device 12), and can make other measurements on operating parameters associated with wireless power circuitry and other components in device 12. In device 24, measurement circuitry 43 can measure coil(s) 48 to determine the inductance(s) and Q-factor value(s) for those coil(s), can measure received power in device 24 (e.g., by measuring the output current and output voltage Vrect of rectifier 50 and/or by otherwise measuring voltages and currents in the wireless power receiving circuitry of device 24), and can make other measurements on the operating parameters associated with wireless power circuitry and other components in device 24.

During negotiations between device 24 and 12 to set up normal power transmission (e.g., during initial wireless power transfer set-up operations before wireless power is ramped up to a level useful for battery charging) and/or later during wireless power transmission operations, measurements such as these may be used to configure system 8 (e.g., wireless power transmitting and receiving circuitry) to enhance wireless power transfer settings. Measurements such as these may also be used to help determine whether power is being lost due to the presence of a foreign object (e.g., a paper clip, coin, or other metallic object between or near devices 12 and 24). For example, the amount of power being received can be compared to the amount of power being transmitted to determine if losses are present that are associated with induced eddy currents in a foreign object.

This approach of comparing transmitted power and received power levels, which may sometimes be referred to as foreign object detection by power counting or power counting foreign object detection, can be used during normal wireless power transmission. In the event that a foreign object is detected during normal wireless power transmission operations, suitable action can be taken. For example, the amount of wireless power that is being transmitted can be lowered, wireless power transmission can be halted, an alert can be issued for a user, and/or other action may be taken.

Foreign object detection operations can also be performed before normal wireless power transmission operations have commenced. For example, measurements with circuitry 41 and/or 43 (e.g., measurements of currents, voltages, inductances, Q-factors, and other operating parameters) may be made during preliminary interactions between devices 12 and 24 (e.g., when a user initially places device 24 in proximity of device 12 for charging such as when a user initially places device 24 on a charging surface of device 12). During these preliminary interactions, which may sometimes be referred to as digital ping operations, device 12 provides a relatively small amount of power (e.g., 200 mW or other small amount) to device 24 to awaken control circuitry in device 24 (e.g., without powering other load circuitry in device 24 such as display circuitry, battery charging circuitry, etc.). By powering the control circuitry and its associated communications circuitry in device 24, devices 12 and 24 can negotiate over a wireless link (e.g., an in-band link) to determine an appropriate wireless power transfer level for system 8 to use during subsequent wireless power transfer operations (e.g., a significantly larger power such as 5 W, 10 W, or other relatively large value associated with normal wireless power transmission operations, which is generally at least 5 times, at least 10 times, or at least 25 times greater than the digital ping power transmission power).

To inform a user that wireless power transmission operations (e.g., operations associated with charging battery 58) are proceeding properly (e.g., to inform the user that this process has not been terminated due to presence of a foreign object), the user may be provided with an alert. The alert, which may sometimes be referred to as a chime, may include audio and/or visual output presented on device 24 (as an example). For example, a chime may involve presentation of an audible chime tone and a visual user interface affordance (e.g., a battery charging icon). By providing the chime, the user is reassured that charging operations are proceeding normally (e.g., so that the user is comfortable walking away from system 8 and leaving devices 12 and 24 unattended until charging is complete).

Digital ping operations are typically performed relatively quickly (e.g., over a time period of 200 ms or less, less than 500 ms, less than 1 s, or other relatively short time period). Subsequent negotiations between device 12 and device 24 leading to commencement of normal (high power) power transmission operations can take significantly longer (e.g., several seconds or more). If the presentation of the chime is delayed significantly (e.g., for more than a second or so), the user may become concerned that wireless power transfer operations are not proceeding normally. If, on the other hand, the chime is presented before system 8 has determined that no foreign objects are present, there is a risk that a foreign object that is present will only be detected later (e.g., during normal operation using a power counting foreign object detection technique, at which point the user may have departed and not be present to observe that charging operations have failed).

To ensure that the chime is provided sufficiently early, the chime may be presented during digital ping operations. This provides the user with prompt assurance (e.g., within a second or less) that wireless power will be transmitted normally and that the battery device 24 will be satisfactorily charged (e.g., after many minutes or hours). To prevent undesired false chimes (which are later invalid because a foreign object is detected only during power counting operations during normal wireless power transmission), foreign object detection operations are performed early as well. In particular, foreign object detection is performed during digital ping operations. In response to determining that no foreign object is present during these digital ping foreign object detection operations, the chime may be presented to the user (e.g., with a speaker, display, and/or other output devices in device 24).

Figure 2:
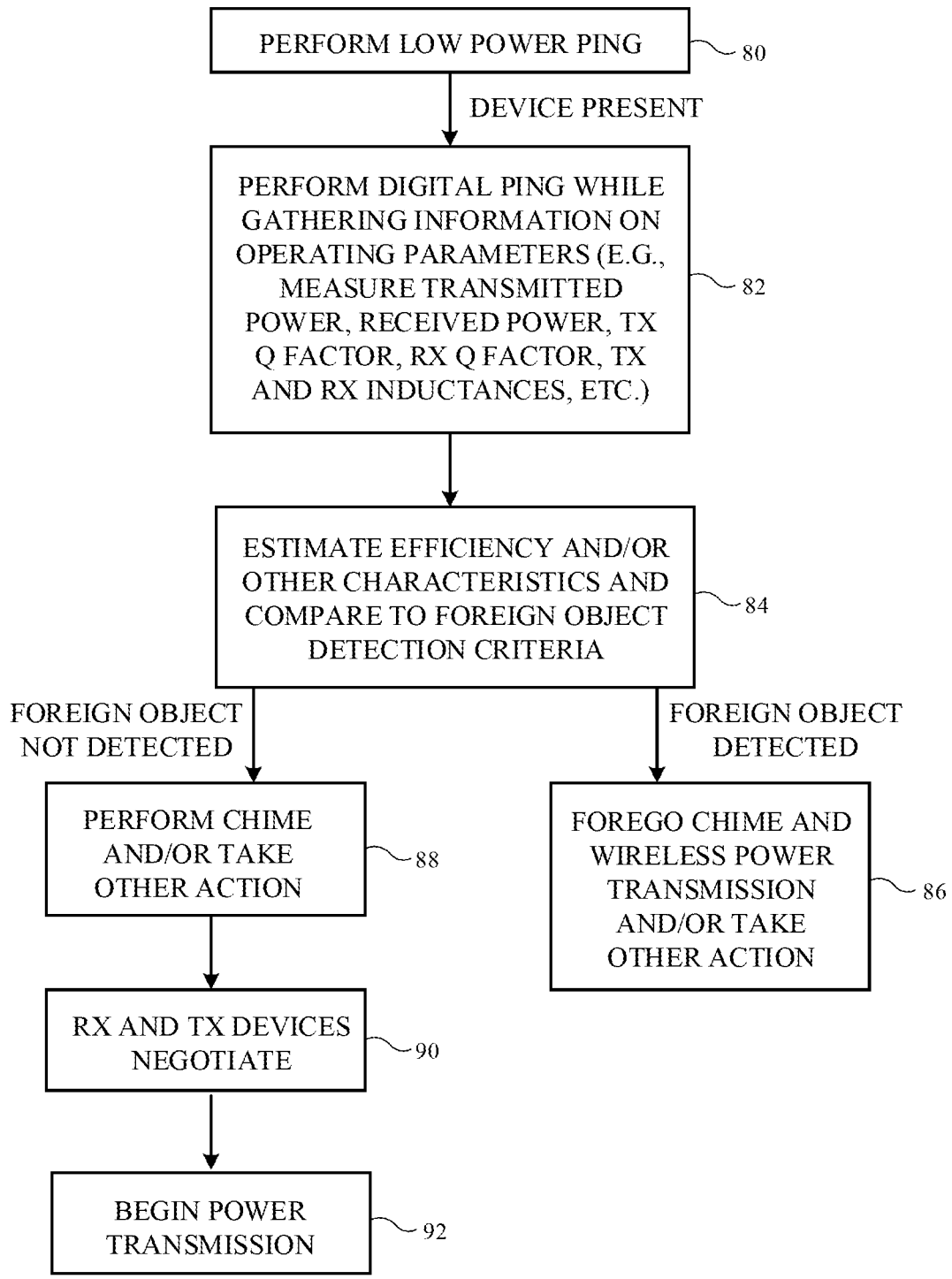
FIG. 2 is a flow chart of illustrative operations involved in operating a wireless power system in accordance with an embodiment.

Illustrative operations associated with using system 8 are shown in FIG. 2.

During the operations of block 80, before digital ping operations are performed, system 8 may perform low power ping operations. During these operations, device 24 may use measurement circuitry 43 to measure the coil inductance for coil(s) 36 and/or make other measurements. If wireless power receiving device 24 is present on the charging surface of device 24, the structures of device 24 (e.g., coil(s) 48 and associated magnetic core material) will alter (e.g., increase) the measured coil inductance value(s) of corresponding coil(s) 36 overlapped by device 24. Accordingly, the coil inductance measurements made during the low power ping operations of block 80 allow device 12 to determine whether device 24 is present and thereby determine that device 12 should begin performing digital ping operations at block 82. If the coil inductances of coils 36 are unchanged, operations may continue at block 80. If, however, a wireless power receiving device is detected as being present, operations may proceed to block 82.

During digital ping operations at block 82, device 12 may transmit small amounts of wireless power (e.g., 200 mW) to device 24. This transmit power level is significantly lower than normal wireless power transmission levels (e.g., normal levels of 5 W or more) and is therefore not used in performing wireless charging of battery 58 in device 24 or powering load components such as a display and other input-output devices 56. The transmitted digital ping power level is sufficient, however, to power communications circuitry in device 24 (e.g., in band-communications circuitry in control circuitry 30).

During the operations of block 82, devices 12 and 24 gather measurements on the operating parameters associated with system 8 while wireless power is transmitted from device 12 to device 24 at the reduced digital ping wireless power level. For example, measurement circuitry 41 can measure coil(s) 36 to determine the inductance(s) and Q-factor value(s) for coil(s) 36. Control circuitry 16 may also use measurement circuitry 41 to measure power transmission efficiency. For example, control circuitry 16 can measure transmitted power in device 12 (e.g., by measuring the direct-current voltage powering inverter 61 and direct-current current of inverter 61 and/or by otherwise measuring voltages and currents in the wireless power transmitting circuitry of device 12) and control circuitry 30 can measure the power received by device 24. Based on the transmitted power and received power measurements, efficiency can be estimated. Other measurements on the operating parameters associated with wireless power circuitry and other components in device 12 may also be made, if desired. In device 24, measurement circuitry 43 can measure coil(s) 48 to determine the inductance(s) and Q-factor value(s) for those coil(s). Measurement circuitry 43 can also measure operating parameters such as the received power in device 24 (e.g., by measuring the output current and output voltage Vrect of rectifier 50 and/or by otherwise measuring voltages and currents in the wireless power receiving circuitry of device 24) and other operating parameters associated with wireless power circuitry and other components in device 24. Measurements made in device 24 (e.g., using circuitry 43) may be conveyed from device 24 to device 12 (e.g., using in-band communications during digital ping operations). If desired, a coupling coefficient associated with the magnetic coupling between coil 36 and coil 48 may be characterized.

Based on these measurements, the present operating state of system 8 may be analyzed to determine whether a foreign object is present. For example, during the operations of block 84 (which may be performed during digital ping operations or shortly thereafter), system 8 (e.g., device 12) may determine the efficiency of the normal wireless power transfer operations that are about to commence based on the measurements of transmitted and received power levels and/or other measurements and can compare this projected power transmission efficiency to predetermined foreign object detection criteria. For example, the efficiency value may be compared to a predetermined efficiency threshold (e.g., an efficiency lower bound). If the efficiency value exceeds the efficiency threshold, device 12 can conclude that no foreign object is present. If the efficiency value does not exceed the threshold, device 12 can conclude that a foreign object is present.

System 8 may use other foreign object detection criteria for determining whether a foreign object is present in addition to or instead of detecting foreign objects by comparing a measured wireless power transmission efficiency level to an efficiency threshold. As an example, the Q factor of the wireless power transmitting coil(s) 36 and the Q factor of the wireless power receiving coil(s) 48 can be measured by circuitry 41 and 43, respectively. The Q factors can then be compared to a threshold Q factor (e.g., a value of 20-40, 30, or other suitable threshold amount). If the measured Q factor for either the transmitting coil or receiving coil does not exceed the Q factor threshold, device 12 can conclude that a foreign object is present. If the Q factor exceeds the threshold, device 12 can conclude that a foreign object is present.

Another illustrative technique for detecting a foreign object during digital ping operations involves measuring the inductance values for the transmitting coil (using measurement circuitry 41) and receiving coil (using measurement circuitry 43). Measured inductance can be lowered due to the presence of a foreign object (e.g., a foreign object formed from a magnetic material). Accordingly, device 12 can compare the measured inductance values to a threshold inductance value. If either the transmitting coil inductance or the receiving coil inductance does not exceed the predetermined inductance threshold, device 12 can conclude that a foreign object is present. Device 12 can otherwise conclude that no foreign object is present.

An additional technique for determining whether a foreign object is present involves estimating the magnetic coupling coefficient k between coil 36 and coil 48. Coupling coefficient k may be estimated from measurements such as the DC input voltage to inverter 61, the value of Vrect at the output of rectifier 50, and other system parameters. If k does not exceed a predetermined threshold (e.g., because magnetic coupling is impaired due to the presence of aluminum foil or other foreign object that tends to shield magnetic fields, device 12 can conclude that a foreign object is present. If k exceeds the coupling coefficient threshold, device 12 can conclude that no foreign object is present.

In addition to these foreign object detection techniques (e.g., techniques involving foreign object detection criteria such as an efficiency threshold, Q-factor threshold, inductance threshold, and coupling coefficient threshold), system 8 (e.g., device 12) may compare other measured system operating parameters to other thresholds, and/or may base a decision of whether a foreign object is present on information associated with two or more of these measurements (e.g., using one or more thresholds or other suitable foreign object detection criteria). The foregoing examples of determining whether a foreign object is present based on information gathered from measurements made during digital ping operations are illustrative. In some embodiments, the combination of efficiency, Q-factor, inductance, and coupling coefficient are modeled as a regression (e.g., linear) for determining whether a foreign object is present.

After determining whether a foreign object is present from information gathered during the digital ping, operations proceed to block 86 or block 88. In response to detecting that a foreign object is present, system 8 (e.g., device 12 and/or device 24) may forego presentation of a chime to the user (block 86). Other suitable actions may also be taken. For example, device 12 may forego wireless power transmission (e.g., by returning to the digital ping operations of block 82 without initiating negotiations with device 24 to initiate full power transfer). As another example, device 12 and/or device 24 can issue a foreign object alert to the user (visually on the display of device 24, audibly using a speaker in device 24, etc.) that informs the user that a foreign object is present, that normal wireless power transmission operations are not proceeding, etc.

If, during the operations of blocks 82 and 84, it is determined that a foreign object is not present (no foreign object is between or near devices 12 and 24 so that wireless power transmission operations can proceed), device 12 and/or device 24 can be used in providing a suitable notification to the user. For example, during the operations of block 88, a chime may be provided to the user indicating that charging is proceeding normally. The chime may include visual information such as a battery charging icon (e.g., an icon displayed on the display of device 24 that includes state-of-charge information for battery 58 and/or other charging status information such as an icon indicating that charging is commencing), text (e.g., battery state-of-charge text such as "50%" indicating that battery 58 has a 50% state of charge), and/or other visual information informing the user that charging is proceeding normally (e.g., because no foreign object has been detected during digital ping operations). The chime may also include audible output. For example, audio output such as a chime tone indicating that charging is proceeding normally may be presented to the user with a speaker in device 24. Device 24 can present the chime upon receipt of an instruction to present the chime that is received wirelessly from device 12 (e.g., via in-band communications) or device 24 can detect that no foreign object is present by virtue of the fact that device 12 is proceeding with wireless power transmission negotiations or other operations that implicitly indicate that no foreign object has been detected. If desired, device 12 may have an output device (e.g., a speaker, display, light-emitting device, etc.) for supplying the user with chime information instead of or in addition to causing device 24 to present the user with the chime.

Regardless of the technique used by device 12 to cause device 24 to generate the chime, the operations of block 88 may be performed during the digital ping and/or immediately after the digital ping (e.g., within less than 500 ms, less than 1 s, or less than other suitably short time period from the time at which device 24 was detected by device 12 during the low-power ping operations of block 80). For example, the alert may be presented within less than 0.5 s, less than 1 s, or less than other suitably short time period from the time at which the user placed device 24 on the charging surface of device 12. Because the chime is presented to the user shortly after placing device 24 on the charging surface of device 12, the user is provided with nearly immediate feedback on whether charging operations (wireless power transmission operations) are proceeding normally or have been adversely affected by the presence of a foreign object. As a result, the user will not leave device 24 on device 12 and walk away from system 8 with an incorrect understanding of the state of system 8 (as might occur if foreign object detection operations were only to be performed later). Rather, the user will be informed almost immediately (e.g., within 1 s or less) that there is an issue. It is helpful for the user to be informed while they are still within the vicinity of device 12.

After presenting the user with the chime at block 88, processing may proceed to block 90. During the operations of block 90, system 8 may determine appropriate settings to use for normal wireless power transmission. In particular, during the operations of block 90, device 12 and device 24 may communicate with each other so that information on the capabilities and/or needs of devices 12 and 24 are shared. As an example, devices 12 and 24 may share device identifiers, power transmission and reception capabilities, battery state-of-charge information, desired wireless power levels, etc. In some embodiments, authentication information may be exchanged.

After negotiations are complete, device 12 can begin normal wireless power transmission operations to transmit wireless power to device 24 (block 92). During the operations of block 92, power may be transmitted at the full power level supported by system 8 (e.g., at 10 W, 5 W, or other suitable rated maximum power level) or may be transmitted at a somewhat lower level (e.g., 2.5 W or other suitable reduced amount that is still significantly above the digital ping power transmission level). The time consumed in completing the negotiations of block 90 to set up wireless power transmission and in initiating the power transmission of block 92 can be several seconds or potentially significantly larger time periods. Because the chime is presented at block 88 before wireless power transmission set-up operations of block 90 for establishing normal wireless power transmission operations at block 92, the user is informed quickly of the current operating state of system 8 (e.g., whether a foreign object is present, whether normal full power charging is proceeding as expected, etc.).

The foregoing is merely illustrative and various modifications can be made to the described embodiments. The foregoing embodiments may be implemented individually or in any combination.

What is claimed is:

1. A wireless power transmitting device, comprising:
   wireless power transmitting circuitry configured to transmit wireless power signals to a wireless power receiving device; and
   control circuitry configured to:
      perform foreign object detection operations during a digital ping including receiving measurements from the wireless power receiving device during the digital ping; and
      in response to determining during the digital ping that a foreign object is not present, cause an alert to be issued during the digital ping.

2. The wireless power transmitting device of claim 1 wherein the control circuitry is further configured to:
   commence wireless power transmission operations in response to determining during the digital ping that a foreign object is not present.

3. The wireless power transmitting device of claim 1 wherein the control circuitry is configured to cause the alert to be issued by sending information to the wireless power receiving device that informs the wireless power receiving device to issue the alert.

4. The wireless power transmitting device of claim 1 wherein the control circuitry is configured to cause the alert to be issued by the wireless power receiving device.

5. The wireless power transmitting device of claim 1 wherein the alert comprises visual information on battery state-of-charge and audio information indicating that wireless power transfer operations are being commenced to charge a battery in the wireless power receiving device and wherein the control circuitry is configured to cause the alert to be issued by the wireless power receiving device.

6. The wireless power transmitting device of claim 1 wherein the control circuitry is configured to perform the foreign object detection operations by gathering information on an amount of power transmitted wirelessly from the wireless power transmitting circuitry to the wireless power receiving device during the digital ping.

7. The wireless power transmitting device of claim 6 wherein the received measurements include information on an amount of power received wirelessly by the wireless power receiving device during the digital ping.

8. The wireless power transmitting device of claim 1 wherein the control circuitry is configured to perform the foreign object detection operations by gathering information on operating parameters associated with wireless power transmission from the wireless power transmission circuitry to the wireless power receiving device.

9. The wireless power transmitting device of claim 8 wherein the control circuitry is configured to perform the foreign object detection operations by comparing the gathered information to foreign object detection criteria.

10. The wireless power transmitting device of claim 9 wherein the information on the operating parameters comprises information on a Q factor value associated with a wireless power transmitting coil in the wireless power transmitting circuitry.

11. The wireless power transmitting device of claim 9 wherein the information on the operating parameters comprises information selected from the group consisting of: Q-factor information, coil inductance information, wireless power transmission efficiency information, and coupling coefficient information.

12. A wireless power transmitting device, comprising:
    wireless power transmitting circuitry configured to transmit wireless power signals to a wireless power receiving device;
    control circuitry configured to:
       perform negotiations with the wireless power receiving device to set up wireless power transmission operations that charge a battery in the wireless power receiving device;
       prior to performing the negotiations, receive, from the wireless power receiving device, information selected from the group consisting of: information on wireless power transmission efficiency, wireless power coil Q-factor information, wireless power coil inductance information, and coupling coefficient information;
       prior to performing the negotiations, analyze the received information to determine whether a foreign object is present; and
       in response to determining that no foreign object is present and prior to performing the negotiations, cause an alert to be issued.

13. The wireless power transmitting device of claim 12 further comprising a charging surface, wherein the control circuitry is configured to gather the information within one second of when the wireless power receiving device is placed on the charging surface.

14. The wireless power transmitting device of claim 13 wherein the control circuitry is configured to cause the alert to be issued within one second of when the wireless power transmitting device is placed on the charging surface.

15. The wireless power transmitting device of claim 12 wherein the control circuitry is configured to analyze the information by comparing the wireless power coil Q-factor information to a Q-factor threshold.

16. The wireless power transmitting device of claim 12 wherein the control circuitry is configured to analyze the information by using information on an amount of wireless power transmitted prior to performing the negotiations and an amount of wireless power receiving prior to performing the negotiations to estimate a power transfer efficiency that is compared to an efficiency threshold.

17. The wireless power transmitting device of claim 12 wherein the control circuitry is configured to analyze the information by analyzing a coupling coefficient between the wireless power transmitting circuitry and the wireless power receiving device.

18. The wireless power transmitting device of claim 12 wherein the control circuitry is configured to analyze the information by comparing wireless power transmission coil inductance information to an inductance threshold.

19. A wireless power transmitting device configured to transmit wireless power to a wireless power receiving device on a charging surface of the wireless power transmitting device, comprising:
control circuitry;
wireless power transmitting circuitry configured to transmit wireless power signals to the wireless power receiving device after the wireless power receiving device has been placed on the charging surface and before negotiations have been completed between the wireless power receiving device and the control circuitry to establish wireless power transmission operations that will charge a battery in the wireless power receiving device, wherein the control circuitry is configured to:
determine whether a foreign object is present before the negotiations have been completed between the wireless power receiving device and the control circuitry using information received from the wireless power receiving device and selected from the group consisting of: wireless power transmission efficiency information, magnetic coupling coefficient information; wireless power transmitting coil inductance information, wireless power receiving coil inductance information, wireless power transmitting coil Q-factor information, wireless power receiving coil Q factor information; and
in response to determining that a foreign object is not present, cause alert information to be presented, within one second of placing the wireless power receiving device on the wireless charging surface, on a display of the wireless power receiving device indicating that wireless power transmission operations to charge the battery are starting.

20. A non-transitory computer-readable storage medium storing one or more programs having computer-executable instructions configured to be executed by one or more processors of a wireless power transmitting device that, when executed, cause a wireless power transmitting device to provide wireless power charging operations to a wireless power receiving device, the computer-executable instructions comprising instructions for:
performing foreign object detection operations during a digital ping by receiving measurements from the wireless power receiving device during the digital ping; and
in response to determining during the digital ping that a foreign object is not present, cause an alert to be issued during the digital ping.

21. A non-transitory computer-readable storage medium storing one or more programs having computer-executable instructions configured to be executed by one or more processors of a wireless power transmitting device that, when executed, cause a wireless power transmitting device to provide wireless power charging operations to a wireless power receiving device, the computer-executable instructions comprising instructions for:
performing negotiations with the wireless power receiving device to set up wireless power transmission operations that charge a battery in the wireless power receiving device;
prior to performing the negotiations, receiving, from the wireless power receiving device, information selected from the group consisting of: information on wireless power transmission efficiency, wireless power coil Q-factor information, wireless power coil inductance information, and coupling coefficient information;
prior to performing the negotiations, analyzing the received information to determine whether a foreign object is present; and
in response to determining that no foreign object is present and prior to performing the negotiations, causing an alert to be issued.

22. A non-transitory computer-readable storage medium storing one or more programs having computer-executable instructions configured to be executed by one or more processors of a wireless power transmitting device that, when executed, cause a wireless power transmitting device to provide wireless power charging operations to a wireless power receiving device, the computer-executable instructions comprising instructions for:
performing negotiations with the wireless power receiving device to set up wireless power transmission operations that charge a battery in the wireless power receiving device;
prior to performing the negotiations, receiving, from the wireless power receiving device, information selected from the group consisting of: information on wireless power transmission efficiency, wireless power transmitting coil Q-factor information, wireless power receiving coil Q-factor information, wireless power transmitting coil inductance information, wireless power receiving coil inductance information, and coupling coefficient information;
during a digital ping prior to performing the negotiations, analyzing the gathered information to determine whether a foreign object is present; and
in response to determining that a foreign object is not present, causing alert information to be presented, within one second of placing the wireless power receiving device on the wireless charging surface, on a display of the wireless power receiving device indicating that wireless power transmission operations to charge the battery are starting.

23. The wireless power transmitting device of claim 1, wherein the control circuitry is further configured to:
in response to determining during the digital ping that a foreign object is present, cause an alert to be issued during the digital ping.

* * * * *